(12) United States Patent
Vornehm

(10) Patent No.: US 11,946,544 B2
(45) Date of Patent: Apr. 2, 2024

(54) SMART ACTUATOR COMPRISING VIBRATION PROCESSING, AND METHOD FOR EVALUATING VIBRATIONS ON A TRANSMISSION COMPONENT

(71) Applicant: Schaeffler Technologies AG & CO. KG, Herzogenaurach (DE)

(72) Inventor: Martin Vornehm, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 145 days.

(21) Appl. No.: 17/599,213

(22) PCT Filed: Feb. 19, 2020

(86) PCT No.: PCT/DE2020/100114
§ 371 (c)(1),
(2) Date: Sep. 28, 2021

(87) PCT Pub. No.: WO2020/224692
PCT Pub. Date: Nov. 12, 2020

(65) Prior Publication Data
US 2022/0178443 A1      Jun. 9, 2022

(30) Foreign Application Priority Data

May 8, 2019   (DE) .......................... 102019111937.5

(51) Int. Cl.
*F16H 63/34* (2006.01)
*F16H 61/12* (2010.01)

(52) U.S. Cl.
CPC ......... *F16H 63/3466* (2013.01); *F16H 61/12* (2013.01); *F16H 63/3425* (2013.01); *F16H 2061/124* (2013.01)

(58) Field of Classification Search
CPC ............... F16H 61/12; F16H 2061/124; F16H 63/3466; F16H 63/3425; F16H 57/01; F16D 2300/18; F16D 2500/5112
See application file for complete search history.

(56) References Cited

U.S. PATENT DOCUMENTS

2006/0261760 A1    11/2006   Shinojima et al.
2010/0301838 A1*   12/2010   Hors ....................... F16H 57/01
                                                  324/155

(Continued)

FOREIGN PATENT DOCUMENTS

CN        108025431        5/2018
DE        102008023371     7/2015

(Continued)

OTHER PUBLICATIONS

Chinese Office Action dated Nov. 4, 2022 for Chinese Patent Application No. 202080018750.5.

(Continued)

*Primary Examiner* — Lori Wu
(74) *Attorney, Agent, or Firm* — Volpe Koenig

(57) ABSTRACT

An actuator (1) for a component, in particular for a transmission component of a motor vehicle, including a processor (2) which is connected to an electric motor (3) for the closed-loop or open-loop control thereof, a final control element (4) which can be moved by the electric motor (3), wherein at least one (actuator-integrated) vibration sensor (5) is coupled to the processor (2), and the processor (2) is designed to evaluate the signals delivered by the vibration sensor. A method for evaluating vibrations on a transmission component of a motor vehicle is also provided, in which vibrations on the transmission component are detected by a vibration sensor (5) on the actuator and are processed in a processor (2) of an electromotive actuator (1).

20 Claims, 2 Drawing Sheets

(56) References Cited

U.S. PATENT DOCUMENTS

| | | | | |
|---|---|---|---|---|
| 2011/0057550 A1* | 3/2011 | Biehl | ................... | F16H 57/01 |
| | | | | 310/68 B |
| 2014/0257643 A1* | 9/2014 | Dufford | ................ | B60T 1/062 |
| | | | | 701/45 |
| 2016/0005246 A1* | 1/2016 | Baker | ..................... | F16D 3/41 |
| | | | | 701/29.1 |
| 2016/0332636 A1 | 11/2016 | Iida et al. | | |
| 2018/0045291 A1* | 2/2018 | Teyssier | ................ | B64C 13/28 |
| 2020/0018667 A1* | 1/2020 | Hansen | ................ | G01D 21/02 |

FOREIGN PATENT DOCUMENTS

| | | | | |
|---|---|---|---|---|
| EP | 3093535 | 11/2010 | | |
| EP | 2824324 | 1/2015 | | |
| WO | 2007099057 | 9/2007 | | |
| WO | WO-2013079044 A2 * | 6/2013 | ............ | F16D 48/06 |
| WO | 2019001642 | 1/2019 | | |

OTHER PUBLICATIONS

"Clonk Noise Optimization of Dual Clutch Automatic Transmission", Yao veneer, KLA-Tencor, Ro Lo, Linhoo, Automotive Engineers, No. 9, pp. 35-36, (Sep. 2017). English Abstract Provided. See English translation of Chinese Office Action dated Nov. 4, 2022 for Chinese Patent Application No. 202080018750.5 for English concise explanation of the relevance.

* cited by examiner

SMART ACTUATOR COMPRISING VIBRATION PROCESSING, AND METHOD FOR EVALUATING VIBRATIONS ON A TRANSMISSION COMPONENT

CROSS-REFERENCE TO RELATED APPLICATIONS

This application is the U.S. National Phase of PCT Appln. No. PCT/DE2020/100114, filed Feb. 19, 2020, which claims priority from German Patent Application No. 10 2019 111 937.5, filed May 8, 2019, the entire disclosures of which is incorporated by reference herein.

TECHNICAL FIELD

The disclosure relates to an actuator for a component, in particular for a transmission component of a motor vehicle, such as a passenger car, e.g., an electric or hybrid vehicle, such as a truck or another utility vehicle, comprising a processor (CPU), e.g., as part of a control device or (power/control) electronics device, which is connected to an electric motor for the closed-loop or open-loop control thereof, and to a final control element that can be moved by the electric motor. The electric motor can also be designed as the main engine of the motor vehicle.

In fields of application that are completely separate from automobiles, such as wind turbines and industrial applications, the use of evaluation algorithms for evaluating vibrations is known, for example from EP 2 824 324 A1, but these algorithms are limited to wind turbines and industrial plants.

Such methods are not known in automotive fields of application; rather, special actuators are only used there in a targeted manner in order to initiate actuating movements. Numerous devices are known for this, such as devices for actuating a parking lock, for example from WO 2019/001 642 A1. There, a device for actuating a parking lock of a transmission is presented, with a movable parking lock pawl that engages in a blocking contour of a parking lock wheel to represent the parking lock when the parking lock is operated by an actuator via a crossmember. In order to stabilize the operation of the parking lock, the crossmember is assigned a damping device with which a repulsion reaction speed of the crossmember during a repulsion process of the parking lock pawl is reduced.

SUMMARY

It is the object of the present disclosure to achieve an inexpensive multi-functionality in actuators of motor vehicles, in particular in actuators of transmission components, actuators arranged in the region of or mounted on transmissions. In principle, the disadvantages known from the prior art should be eliminated or at least mitigated.

This is achieved a generic actuator having one or more of the features disclosed herein.

At least one (preferably actuator-integrated) vibration sensor or several (preferably actuator-integrated) vibration sensors is/are coupled to the processor, and the processor is designed to evaluate the signals delivered by the vibration sensor or the vibration sensors.

The disclosure thus enables drive noise monitoring in vehicles, in particular in those without individual owners, for example in fleets, pools or electric taxis. In the actuator configuration according to the disclosure, an actuator control device also carries out NVH signal processing (Noise-Vibration-Harshness signal processing), namely in particular during pauses between actuation. Efficient use of the actuator is achieved over time, particularly during pauses between actuation. Separate, conventional sensors, e.g., arranged away from the actuator, thus become superfluous. The actuator control device can serve as a drive control device for an e-axle, which then also carries out the NVH signal processing. The actuator itself can then be used as an NVH diagnostic device. A "smart check" then becomes possible.

Advantageous embodiments are claimed in the claims and are explained in greater detail below.

It is therefore advantageous if the processor (CPU) is designed to report/signal and/or store/file the evaluation and/or the signals. This enables permanent retrieval for monitoring purposes.

An advantageous embodiment is also characterized in that the processor is connected to a storage device. This storage device can be present internally or externally, that is to say either in the immediate vicinity of the electric motor and/or the final control element, or at a distance from it. A short line with physical conductors/cables can be used, or wireless transmission can be used.

If the vibration sensor is intended for vibration-resistant attachment to a transmission part in a housing of the actuator, then the vibration to be detected can be detected directly at the point where the vibration occurs. It is advantageous if the vibration sensor is not connected to the housing or the transmission component that holds the housing in an elastic/fixed/rigid manner.

It is advantageous if the CPU is set up to use more than 20% to 50% of the computing power for the vibration evaluation (but not more than 99%) and to use less than 50%, preferably on average less than 15%, and preferably between 1% and 14%, of the computing power to accomplish actuation tasks. It is also advantageous if the processor either handles one task, for example the sound analysis, or the other task, namely causing the movement of the final control element. The two tasks are processed disjointly in the processor, for which it is also set up accordingly. The storage device can be designed as a signal processing program and value memory, possibly integrated with an actuator program and value memory on an electronic circuit board.

In order to achieve a precise result of the actuator, it has been found to be advantageous if the vibration sensor is intended for vibration-resistant attachment to a transmission part or a housing of the actuator. It has proven particularly useful to attach the vibration sensor directly to the housing, preferably on the inner side of the housing.

If the housing at least partially surrounds or even encapsulates the electric motor and the vibration sensor, the electronic components are effectively prevented from becoming dirty and exposed to moisture.

It has proven useful if the vibration sensor is designed as a structure-borne sound sensor or an acceleration sensor. During pauses in actuation, which, for example, account for the majority of time in the case of parking locks, the processing of computing-time-intensive functions in the control devices allows for reliable damage prediction.

A fixed installation allows said actuator with the structure-borne sound or acceleration sensor to listen to and diagnose the transmission. Examples of computing-intensive NVA diagnosis evaluation operations have already been indicated in EP 2 824 324 A1 and should be considered to be fully integrated here. The methods described in EP 2 824 324 A1 are therefore intended to be used in the completely different field of motor vehicle technology and are to be considered as disclosed here.

It is also advantageous if the vibration sensor is designed for the perception and detection of vibrations between 10 Hz and 40 kHz, in particular between 1 kHz and 10 kHz.

It is expedient if the vibration sensor is prepared for detecting anon-directional or directional, for example tri-axial, signal.

The aim is for an interface, for example in the form of a connector, to be present in the housing for supplying power to the processor, the electric motor (which is generally understood here as an actuating unit) and the vibration sensor.

It is also advantageous if the storage device is present in the housing and is connected to the processor and/or the vibration sensor. In particular, arranging these components in the housing has advantages in terms of packaging and reliability.

It is desired that the actuator is designed to carry out an NVH analysis. For example, limit value comparisons of the vibration intensities specific to the driving conditions can be used here.

In order to enable a particularly wide range of applications, it is advantageous if the actuator is designed as a parking lock actuator, seat adjustment actuator, pump actuator, clutch actuator, switch actuator, gear setting actuator, dial actuator, or actuator for a swingarm with chassis action (roll stabilizer) or e-axle actuator.

The disclosure ultimately also relates to a method for evaluating vibrations in a transmission component of a motor vehicle, in which vibrations on the transmission component are detected by a vibration sensor on the actuator (actuator integrated) and are processed in a processor of an electromotive actuator, for example, in a form according to the disclosure.

Examples of computationally intensive NVH diagnosis evaluation operations, possibly also in combination, are:
minimum/maximum value monitoring (peaks),
driving condition-specific limit value comparisons of the vibration intensity,
RMS formation (root mean square of one or more signals),
digital filtering, e.g., for fixed frequencies (bandpass) or for smoothing using prepared signals (e.g., RMS pre-processing),
Fourier transforms, as well as FFT (Fast Fourier Transforms), which are also very computing-intensive,
autocorrelations or cross-correlations between different signals,
order analyses (i.e., analyses that take into account synchronicity for rotational frequencies or gear wheel tooth frequencies) and/or
cumulations (with counting or addition of conspicuous signal curves or signal values or the shortest (time) intervals between conspicuous signal curves).

The use of existing electronic hardware (housing, connectors, signal lines such as CAN) results in a cost advantage or a functional advantage with almost identical costs (only certain additional costs could be seen in the program storage device and the raw signal sensor for structure-borne sound, for example).

In many monitoring tasks, a non-permanent, rather random monitoring of the noise behavior is sufficient, for example once per kilometer and not over the entire time period, which is why the use of the actuator according to the disclosure has great advantages. It is desired that the actuator, e.g., for the parking lock or for the gears, is vibration-resistant and fixed to the transmission. For safety reasons, the actuator can often be designed as a "smart" actuator with control electronics, also to ensure emergency operation or diagnosis and/or intrinsic safety.

In the context of "shared economy" and "fleet ownership", the function of safety-monitoring and the responsibility of the owner is now much easier to perceive. With regard to the noise behavior of transmissions/e-drives, it is therefore proposed to generate and forward information used for diagnosis by detecting and analyzing it in a control device which is also provided for actuation.

In other words, often unused control electronics are now accessed by actuators, in particular in the case of parking lock actuators. The disclosure now provides for these electronics to be used to process various tasks. These can be computing-intensive tasks such as for the analysis of vibration behavior for NVH analysis/NVH reduction. For this purpose, the actuator/electronics can have additional components/sensors for determining values/vibration behavior. This is particularly the case with actuators that are fixed to the housing/transmission, such as the parking lock actuator.

The focus is therefore on a method that carries out an NVH analysis in the automotive sector. The focus is also on an actuator with (power/control) electronics, which is designed to carry out said NVH analysis. An integrated structure-borne sound sensor is advantageous here.

The electronics of several actuators can also work in parallel. Relevant actuators can also be axle e-drives, pump actuators, clutch actuators, switch actuators, gear setting actuators, dial actuators, or actuators for a swingarm with chassis action (roll stabilizer) or seat adjustment actuators. The parking lock actuator is preferably used. The parking lock actuator of WO 2019/001642 A1 is only one example, albeit a preferred example for the adaptation to implement the idea according to the disclosure. Ultimately, however, the focus is also on the use of electronics.

BRIEF DESCRIPTION OF THE DRAWINGS

The disclosure is further explained below with the aid of a drawing. In the figures.

DETAILED DESCRIPTION

The figures are only schematic in nature. They serve merely to assist in the under-standing of the disclosure. The same elements are provided with the same reference signs. Features of the individual exemplary embodiments can be interchanged with one another or combined with one another.

Figure 1:
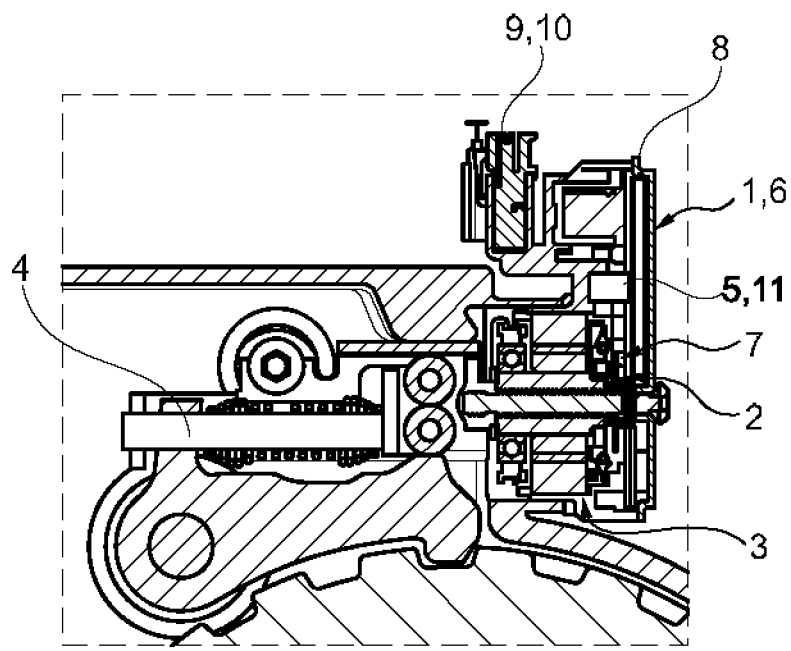
FIG. 1 shows a cross-sectional view through an actuator according to the disclosure in the form of a parking lock actuator.

An actuator 1 according to the disclosure is shown in FIG. 1. It is intended to be attached to a transmission component (not shown). It has a processor 2. An actuator/electric motor 3 is also present. The processor 2 and the electric motor 3 are connected to one another. The electric motor 3 is connected to a final control element 4 to drive said final control element. There is at least one vibration sensor 5 which is coupled to the processor 2. The processor 2 is designed to evaluate information that is supplied by the vibration sensor. In the exemplary embodiment described here, the actuator 1 is designed as a parking lock actuator 6. There is also a storage device 7 present.

The processor 2, the electric motor 3, the final control element 4, the vibration sensor 5 and the storage device 7 are arranged within a housing 8. An interface 9, namely a connector 10, is also present.

The vibration sensor 5 is designed as a structure-borne sound sensor 11. The connector 10 is designed for bus signals and for supplying energy to the electromechanical actuator 1. The structure-borne sound sensor 11 is in mechanical contact with the transmission/(actuator) housing 8 and in electrical contact with control device electronics (e.g., via spring contacts or a cable).

The storage device 7 is designed as a signal processing program and value memory device and is possibly integrated with an actuator program and value memory on an electronic circuit board.

The actuating unit/the electric motor 3 is basically understood as an electromechanical actuator drive, which can then also be designed as an electromagnet or servo valve.

Figure 2:
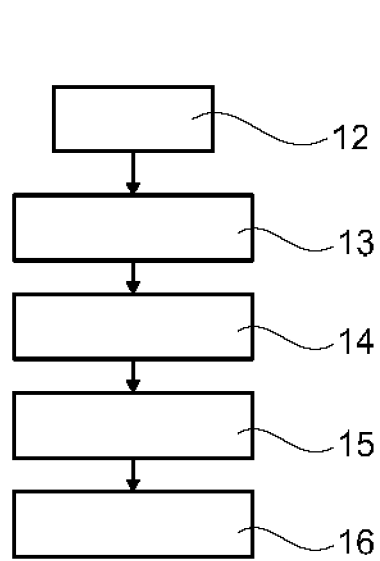
FIG. 2 shows the sequence of a method according to the disclosure.

In FIG. 2, a sequence of work steps is symbolized by the reference signs 12, 13, 14, 15 and 16. The reference sign 12 relates to a raw signal detection/structure-borne sound detection. The reference sign 13 relates to a digital bandpass filtering of several frequencies. This is followed by a (positive or negative) weighted addition of selected squares, symbolized by the reference sign 14, in order to provide the spectral intensity. The reference sign 15 relates to a limit value monitoring of the spectral intensity, for example by means of the detection of differences in intensity. The sequence is concluded by the provision/storage of a signal in the event of a limit value being exceeded at the position of reference sign 16.

Figure 3:
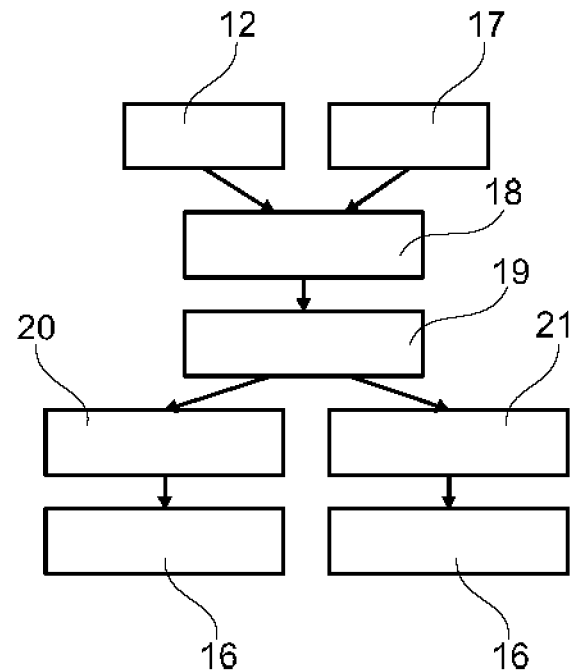
FIG. 3 shows the sequence of a further method according to the disclosure.

A variant of this is shown in the sequence according to FIG. 3. There is also the angle of rotation as a raw signal, possibly the CAN at the point of reference sign 17. Thereafter, at the point of reference sign 18, the formation of a plurality of moving averages at different angles of rotation takes place. This is followed by a (positively or negatively) weighted addition of selected mean values for the delivery of order analyses at the point of reference sign 19. Limit value monitoring of a selected order then ensues for a special component, see reference signs 20 and 21. Reference sign 20 relates to a first component, for example a gear wheel, and the reference sign 21 to a second, separate component, for example a bearing. This is then followed by the provision/storage of a signal when the limit value is exceeded, as already explained with reference sign 16.

Figure 4:
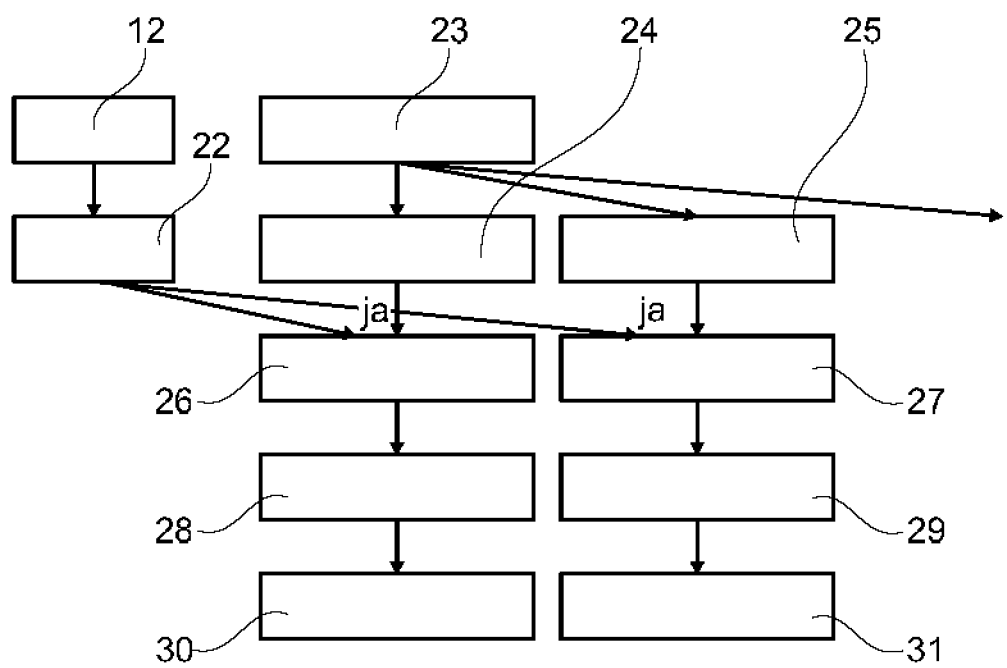
FIG. 4 shows the sequence of a further method according to the disclosure.

The provision of special status windows, which are typical for a special operating mode of the motor vehicle, in which predefined signals, e.g., also sector-related, are compared with occurring signals, is the core of the method according to the disclosure of FIG. 4. The raw signal, that is to say the structure-borne sound, is also recorded there at the point of reference sign 12, followed by the analysis of the signal (filter) in accordance with reference sign 22.

Further signals, such as speed, torque/temperature, possibly via CAN according to reference sign 23, can also be taken into account.

It is then verified whether the signals are within the predefined monitoring intervals/windows, according to reference signs 24 and 25.

If this is the case, the analyzed signal is stored in the respective interval (see reference signs 26 and 27), then the comparison of the stored value with previous storage devices (see reference signs 28 and 29) and the provision/storage of a signal that a change limit has been exceeded (see reference signs 30 and 31).

LIST OF REFERENCE SIGNS

1 Actuator
2 Processor
3 Electric motor
4 Final control element
5 Vibration sensor
6 Parking lock actuator
7 Storage device
8 Housing
9 Interface
10 Connector
11 Structure-borne sound sensor
12 Raw signal detection/structure-borne sound detection
13 Digital bandpass filtering
14 Addition
15 Limit value monitoring
16 Provision/Storage
17 Angle of rotation
18 Mean value
19 Weighted addition
20 Limit value monitoring component 1
21 Limit value monitoring component 2
22 Analysis
23 Additional signals
24 Signal monitoring
25 Signal monitoring
26 Storage
27 Storage
28 Comparison
29 Comparison
30 Provision/Storage
31 Provision/Storage

The invention claimed is:

1. An actuator for a component, the actuator comprising:
an electric motor;
a processor which is connected to the electric motor for closed-loop or open-loop control thereof;
a final control element that is movable by the electric motor;
at least one vibration sensor coupled to the processor, wherein the processor is configured to evaluate signals delivered by the vibration sensor; and
a housing at least partially surrounds each of the electric motor, the processor, and the at least one vibration sensor.

2. The actuator according to claim 1, wherein the actuator is mounted on a transmission of a power train of a motor vehicle.

3. The actuator according to claim 1, wherein the processor is further configured to at least one of report or store at least one of an evaluation or the signals.

4. The actuator according to claim 1, wherein the processor is connected to a storage device.

5. The actuator according to claim 4, wherein the storage device is arranged in the housing of the actuator, and the storage device is connected to at least one of the processor or the vibration sensor.

6. The actuator according to claim 1, wherein the vibration sensor is configured for vibration-resistant attachment to a transmission part or the housing of the actuator.

7. The actuator according to claim 1, wherein a connector is disposed within the housing and coupled through a wired connection to the processor, the connector being configured to transfer at least bus signals and power to the processor.

8. The actuator according to claim 1, wherein the vibration sensor is configured as a structure-borne sound sensor or acceleration sensor.

9. The actuator according to claim 1, wherein the actuator is configured to carry out an NVH analysis.

10. The actuator according to claim 1, wherein the actuator is configured as a parking lock actuator, seat adjustment actuator, a pump actuator, a clutch actuator, a switch actuator, a gear setting actuator, a dial actuator, an actuator for a swingarm with chassis action, or e-axle actuator.

11. A method for evaluating vibrations in a transmission component of a motor vehicle, the method comprising:
   detecting vibrations on the transmission component by a vibration sensor on an electric motor of an electromotive actuator, and processing the detected vibrations in a processor of the electromotive actuator;
   wherein a housing at least partially surrounds each of the electric motor, the processor, and the vibration sensor.

12. The actuator according to claim 1, wherein the component is a transmission component of a motor vehicle.

13. An actuator for a component, the actuator comprising:
   an electric motor;
   a processor connected to the electric motor for closed-loop or open-loop control thereof;
   a connector coupled through a wired connection to the processor, the connector being configured to transfer at least bus signals and power to the processor;
   a final control element that is movable by the electric motor; and
   a vibration sensor coupled to the processor, wherein the processor is configured to receive and evaluate signals from the vibration sensor, and store at least one of the signals or results of the signal evaluation in a memory.

14. The actuator according to claim 13, wherein the actuator is mounted on a transmission of a power train of a motor vehicle.

15. The actuator according to claim 13, wherein the processor is further configured to report the results of the signal evaluation.

16. The actuator according to claim 13, wherein the vibration sensor is configured for vibration-resistant attachment to a transmission part or a housing of the actuator.

17. The actuator according to claim 13, wherein a housing at least partially surrounds the electric motor, the processor, and the vibration sensor.

18. The actuator according to claim 13, wherein the vibration sensor is configured as a structure-borne sound sensor or acceleration sensor.

19. The actuator according to claim 13, wherein the actuator is configured to carry out an NVH analysis.

20. The actuator according to claim 13, wherein the actuator is configured as a parking lock actuator, seat adjustment actuator, a pump actuator, a clutch actuator, a switch actuator, a gear setting actuator, a dial actuator, an actuator for a swingarm with chassis action, or e-axle actuator.

* * * * *